(12) United States Patent
Goluszek

(10) Patent No.: US 6,211,657 B1
(45) Date of Patent: Apr. 3, 2001

(54) TWO STAGE POWER CONVERTER WITH INTERLEAVED BUCK REGULATORS

(75) Inventor: Daniel Goluszek, Palo Alto, CA (US)

(73) Assignee: Communications & Power Industries, Inc., San Carlos, CA (US)

( * ) Notice: Subject to any disclaimer, the term of this patent is extended or adjusted under 35 U.S.C. 154(b) by 0 days.

(21) Appl. No.: 09/574,712

(22) Filed: May 18, 2000

(51) Int. Cl.[7] .............................. G05F 1/40; G05F 1/44; G05F 1/56
(52) U.S. Cl. .......................................... 323/272; 323/284
(58) Field of Search .................... 323/271, 272, 323/282, 284

(56) References Cited

U.S. PATENT DOCUMENTS

| 5,132,888 | 7/1992 | Lo et al. | 363/17 |
|---|---|---|---|
| 5,583,753 | * 12/1996 | Takayama | 363/71 |
| 5,815,386 | * 9/1998 | Gordon | 363/50 |
| 5,870,296 | * 2/1999 | Schaffer | 363/65 |
| 5,886,508 | * 3/1999 | Jutras | 323/267 |
| 5,894,243 | 4/1999 | Hwang | 327/540 |
| 5,929,692 | * 7/1999 | Carsten | 327/531 |
| 5,959,441 | * 9/1999 | Brown | 323/282 |
| 6,020,691 | * 2/2000 | Sun et al. | 315/307 |
| 6,023,154 | * 2/2000 | Martinez | 323/272 |

* cited by examiner

Primary Examiner—Peter S. Wong
Assistant Examiner—Bao Q. Vu
(74) Attorney, Agent, or Firm—Thelen Reid & Priest LLP; David B. Ritchie

(57) ABSTRACT

A two-stage high power converter produces a highly regulated DC voltage from unregulated DC input. The first stage, having a plurality of interleaved buck regulators connected in parallel, converts unregulated DC voltage into regulated DC current. The second stage comprises a bridge for receiving the regulated current from the first stage, and converting it into AC voltage, which is in turn applied a step-up transformer. The secondary voltage of the transformer is rectified and filtered to produce low noise DC voltage. A method of converting unregulated DC voltage into regulated DC voltage comprises paralleling a plurality of interleaved buck regulators, where each of the buck regulators includes a switch. Each of the switches is controlled to operate at the same set frequency equal to two times the bridge operating frequency divided by the number of interleaved buck regulators. The combined current from interleaved buck regulators is fed to the bridge.

11 Claims, 6 Drawing Sheets

TWO STAGE POWER CONVERTER WITH INTERLEAVED BUCK REGULATORS

BACKGROUND OF THE INVENTION

1. Field of the Invention

The present invention relates to power supplies. More particularly, the present invention relates to high voltage low ripple power converters.

2. Background Art

In certain applications requiring a high voltage power source, it is desirable that the power source is substantially free of ripple effects. One known method of generating regulated high DC voltage at high power level involves rectifying an AC power source (e.g., 208 VAC, 60 Hz) and then converting the rectified DC voltage into high voltage using a high frequency switching converter. In such a scheme, the low frequency ripple components, mainly the line harmonics, are attenuated by a voltage feedback loop, whereas the high frequency components, produced by the switching converter, are greatly reduced by an LC output filter. Increasing the switching frequency makes the filtering easier—the feedback loop gain can be increased which improves input ripple rejection, and the low pass filter (removing switching noise from the output) becomes more effective. On the other hand, the higher switching frequency reduces the efficiency of the power converter. The objective is to find a topology that would allow the power converter to operate at a high frequency and with a good efficiency and to produce low noise, high stability, and high voltage output.

FIG. 1 is a schematic diagram of a two-stage power converter in accordance with the prior art. The converter 10 includes a buck regulator stage 12 and a bridge stage 14. A transformer 17 is also shown. The converter operates as follows. A three-phase power source (e.g., 208 volts at 60 hertz) is applied to rectifier 16. Unregulated rectified DC power is applied to the buck regulator stage 12, which includes a single buck regulator. The buck regulator comprises a switch 20, an inductor 30, and a diode 25. The buck regulator 12 produces DC pulses that are integrated by inductor 30 and received by the bridge 14. The bridge comprises four switches 32, 34, 36, 38 which act in concert to produce an alternating current from the DC pulses.

FIG. 2A is a diagram showing the switch current in the buck regulator stage of a two-stage power converter in accordance with the prior art, as shown in FIG. 1. FIG. 2B is a diagram showing the inductor current in the buck regulator stage of a two-stage power converter in accordance with the prior art, as shown in FIG. 1. FIG. 2C is a diagram showing the transformer current in a two-stage power converter in accordance with the prior art, as shown in FIG. 1. FIGS. 2A, 2B and 2C have equivalent horizontal axes so as to better compare the wave forms. FIG. 2A shows the current through switch 20, which is operating, for example, at 100 Khz. The wave form may be described as a DC pulse train. FIG. 2B shows the current through inductor 30. The wave form may be described as an integrated DC pulse train. The bridge stage 14 requires two DC Current pulses to produce a single cycle of the output 50 KHz AC, as shown in FIG. 2C.

Since buck regulator stage 12 must produce two pulses of DC power for each cycle of the output frequency, the switch 20 must operate at twice the output AC frequency. Higher switching frequencies at switch 20 generally result in greater power loss and require more expensive switching components. Also, higher currents at inductor 30 generally require more expensive inductor components.

It is therefore desirable to minimize switching power losses, as well as to reduce component costs, in similar circuits.

BRIEF DESCRIPTION OF THE INVENTION

A two-stage high power converter produces a highly regulated DC voltage from unregulated DC input. The first stage, having a plurality of interleaved buck regulators connected in parallel, converts unregulated DC voltage into regulated DC current. The second stage comprises a bridge for receiving the regulated current from the first stage, and converting it into AC voltage, which is in turn applied a step-up transformer. The secondary voltage of the transformer is rectified and filtered to produce low noise DC voltage. A method of converting unregulated DC voltage into regulated DC voltage comprises paralleling a plurality of interleaved buck regulators, where each of the buck regulators includes a switch. Each of the switches is controlled to operate at the same set frequency equal to two times the bridge operating frequency divided by the number of interleaved buck regulators. The combined current from interleaved buck regulators is fed to the bridge.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons having the benefit of this disclosure.

Figure 3:
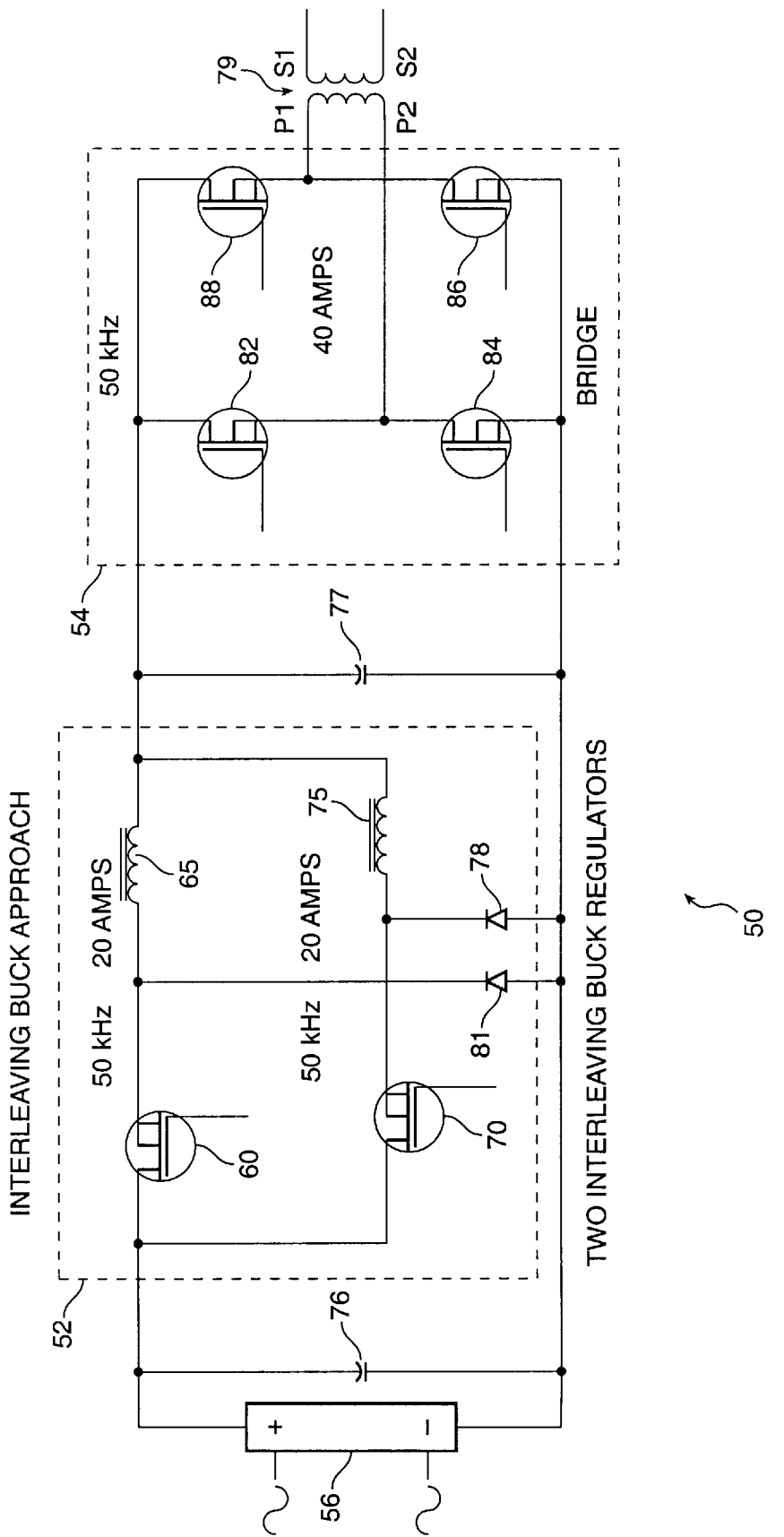
FIG. 3 is a schematic diagram of a two-stage power converter in accordance with a specific embodiment of the present invention.

FIG. 3 is a schematic diagram of a two-stage power converter in accordance with a specific embodiment of the present invention. The converter 50 includes a buck regulator stage 52 and a bridge stage 54. By way of example, the converter produces a 50 KHz AC current. The converter operates as follows. A three-phase power source (e.g., 208 volts at 60 hertz) is applied to rectifier 56. Unregulated rectified DC power is applied to the buck regulator stage 52, which includes two interleaved buck regulators. One buck regulator comprises switch 60 and inductor 65. The other buck regulator comprises switch 70 and inductor 75. The switches comprise transistors. The buck regulator stage 52 produces regulated DC current that is received by the bridge 54. Each of the switches in buck regulator stage 52 operates at 50 KHz. The bridge comprises four switches 82, 84, 86, 88 which act in concert to produce an alternating current from the modulated DC pulses.

Capacitors 76, 77 and diodes 78, 81 are also shown. The output of bridge stage 54 is received by transformer 79.

Figure 4:
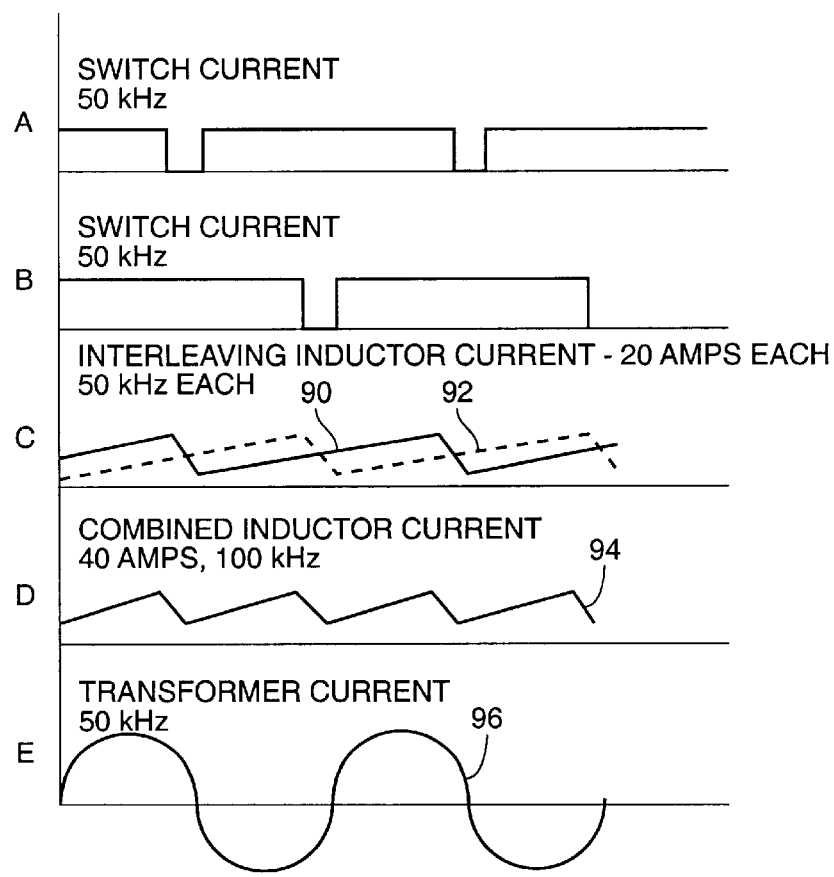
FIG. 4A is a diagram showing the switch current at one switch in a buck regulator stage having two interleaved buck regulators, in accordance with a specific embodiment of the present invention as shown in FIG. 3.
FIG. 4B is a diagram showing the switch current at the other switch in a buck regulator stage having two interleaved buck regulators, in accordance with a specific embodiment of the present invention as shown in FIG. 3.
FIG. 4C is a diagram showing the inductor currents at the inductors in a buck regulator stage having two interleaved buck regulators, in accordance with a specific embodiment of the present invention as shown in FIG. 3.
FIG. 4D is a diagram showing the combined wave form produced by the buck regulator stage of a two-stage power converter in accordance with a specific embodiment of the present invention as shown in FIG. 3.
FIG. 4E is a diagram showing the transformer current in a buck regulator stage having two interleaved buck regulators, in accordance with a specific embodiment of the present invention as shown in FIG. 3.

FIG. 4A is a diagram showing the switch current at one switch in a buck regulator stage having two interleaved buck regulators, in accordance with an embodiment of the present invention, as shown in FIG. 3. FIG. 4B is a diagram showing the switch current at the other switch in a buck regulator stage having two interleaved buck regulators, in accordance with a specific embodiment of the present invention as shown in FIG. 3. It can be seen that both switches are operating at 50 KHz, and that the DC pulses are 180 degrees out of phase with each other.

FIG. 4C is a diagram showing the inductor currents at the inductors in a buck regulator stage having two interleaved buck regulators, in accordance with a specific embodiment of the present invention as shown in FIG. 3. Integrated DC pulse train 90 is produced from the DC pulse train shown in FIG. 4A. Integrated DC pulse train 92 is produced from the DC pulse train shown in FIG. 4B. Each of the wave forms has a frequency of 50 KHz. The wave forms are 180 degrees out of phase.

Figure 1:
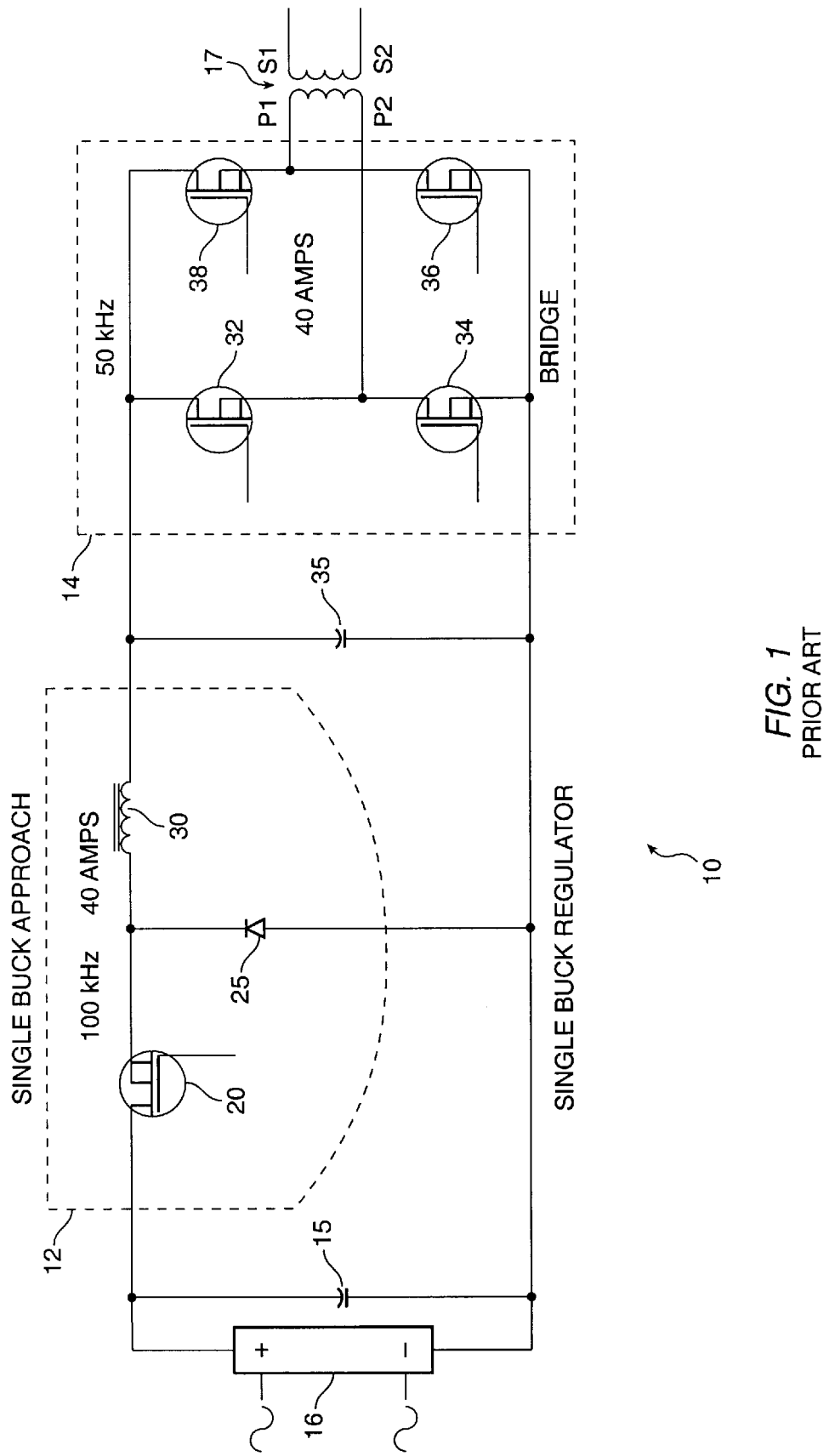
FIG. 1 is a schematic diagram of a two-stage power converter in accordance with the prior art.
Figure 2:
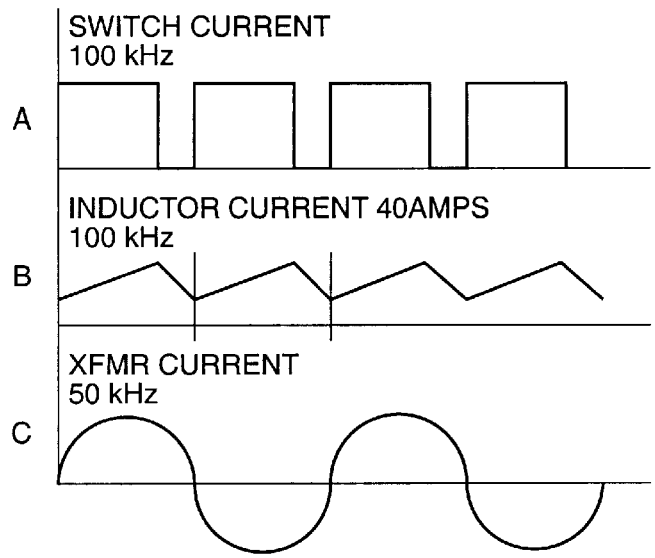
FIG. 2A is a diagram showing the switch current in the buck regulator stage of a two-stage power converter in accordance with the prior art, as shown in FIG. 1.
FIG. 2B is a diagram showing the inductor current in the buck regulator stage of a two-stage power converter in accordance with the prior art, as shown in FIG. 1.
FIG. 2C is a diagram showing the transformer current in a two-stage power converter in accordance with the prior art, as shown in FIG. 1.

FIG. 4D is a diagram showing the combined wave form produced by the buck regulator stage of a two-stage power converter in accordance with a specific embodiment of the present invention as shown in FIG. 3. Wave form 94 represents the combined current of wave forms 90 and 92, and has an AC component of fundamental frequency of 100 KHz. Wave form 94 is substantially identical to the wave form shown in FIG. 2B.

FIG. 4E is a diagram showing the wave form produced by the bridge stage of a two-stage power converter in accordance with a specific embodiment of the present invention as shown in FIG. 3. Wave form 96 has a frequency of 50 KHz, and is substantially identical to the wave form shown in FIG. 2C.

FIGS. 4A, 4B, 4C, 4D and 4E have equivalent horizontal axes so as to better compare the wave forms. FIG. 4D exemplifies the combined wave form of a buck regulator stage 52 providing integrated DC pulse train with AC component of fundamental frequency of 100 KHz. As in the prior art, the bridge stage 54 requires two DC current pulses from the buck stage to produce a single cycle of the output AC.

By providing a plurality of interleaved buck regulators in the buck regulator stage, the individual buck regulators in the stage are allowed to operate both at lower frequencies and at lower power. Since transistor switches tend to become less efficient at high frequencies, the present invention results in higher efficiency by reducing switching losses. The present invention also requires less expensive components, because of reduced performance demands on the individual buck regulators.

Figure 5:
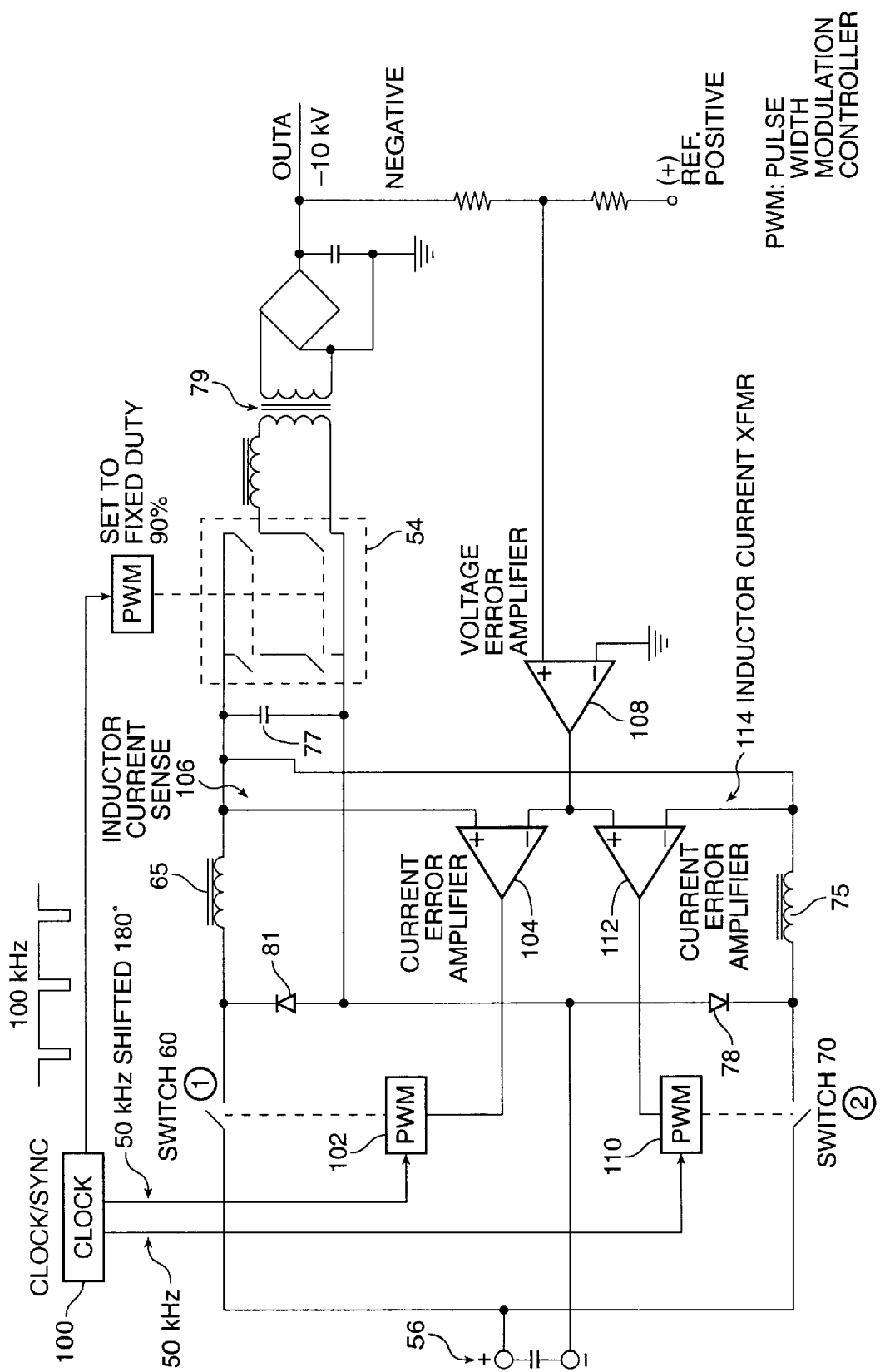
FIG. 5 is a schematic diagram of a two-stage power converter in accordance with a specific embodiment of the present invention.

FIG. 5 is a schematic diagram of a two-stage power converter in accordance with a specific embodiment of the present invention. FIG. 5 shows greater detail of the converter shown in FIG. 3. In particular, FIG. 5 demonstrates how the buck regulator stage is synchronized with the bridge stage 54, and how equal current sharing between the interleaved buck regulators is accomplished.

Clock 100 provides a timing signal to both stages of the converter. A 100 KHz clock signal is provided to the bridge stage 54. Out of phase 50 KHz clock signals are provided to each of the buck regulators in the buck regulator stage. The clock provides synchronized signals to the two stages.

It is important that current be shared equally between the buck regulators. If current is not shared equally, unwanted noise in the output signal will result. Also, overload of one of the buck regulators might occur. Equal current sharing may be accomplished by identically matching the components of all the buck regulators, however, this might prove impractical in a manufacturing environment. In a preferred embodiment, instead, equal current sharing is accomplished by controlling each buck inductor current individually.

Referring still to FIG. 5, switch 60 in one buck regulator is controlled by pulse width modulation controller 102. In turn, pulse width modulation controller 102 is controlled by signals from the clock 100 and from current error amplifier 104. The signal from the clock turns on switch 60. The signal from current error amplifier 104 sets the "on" time switch 60 thus controlling inductor current. Current error amplifier 104 compares inductor current at inductor 65, against the current demand signal from voltage error amplifier 108, which senses voltage at the output of the converter.

In the other buck regulator, the inductor current is similarly controlled by pulse width modulation controller 110, clock 100, current error amplifier 112, inductor current sensor 114 and voltage error amplifier 108.

By using such control to regulate the switch currents in the interleaved buck regulators, equal current sharing between the buck regulators is accomplished. Also, regulators in current mode provide inherent attenuation of the input ripple. This performance improvement is in addition to line regulation achieved by using regular voltage feedback loop.

Figure 6:
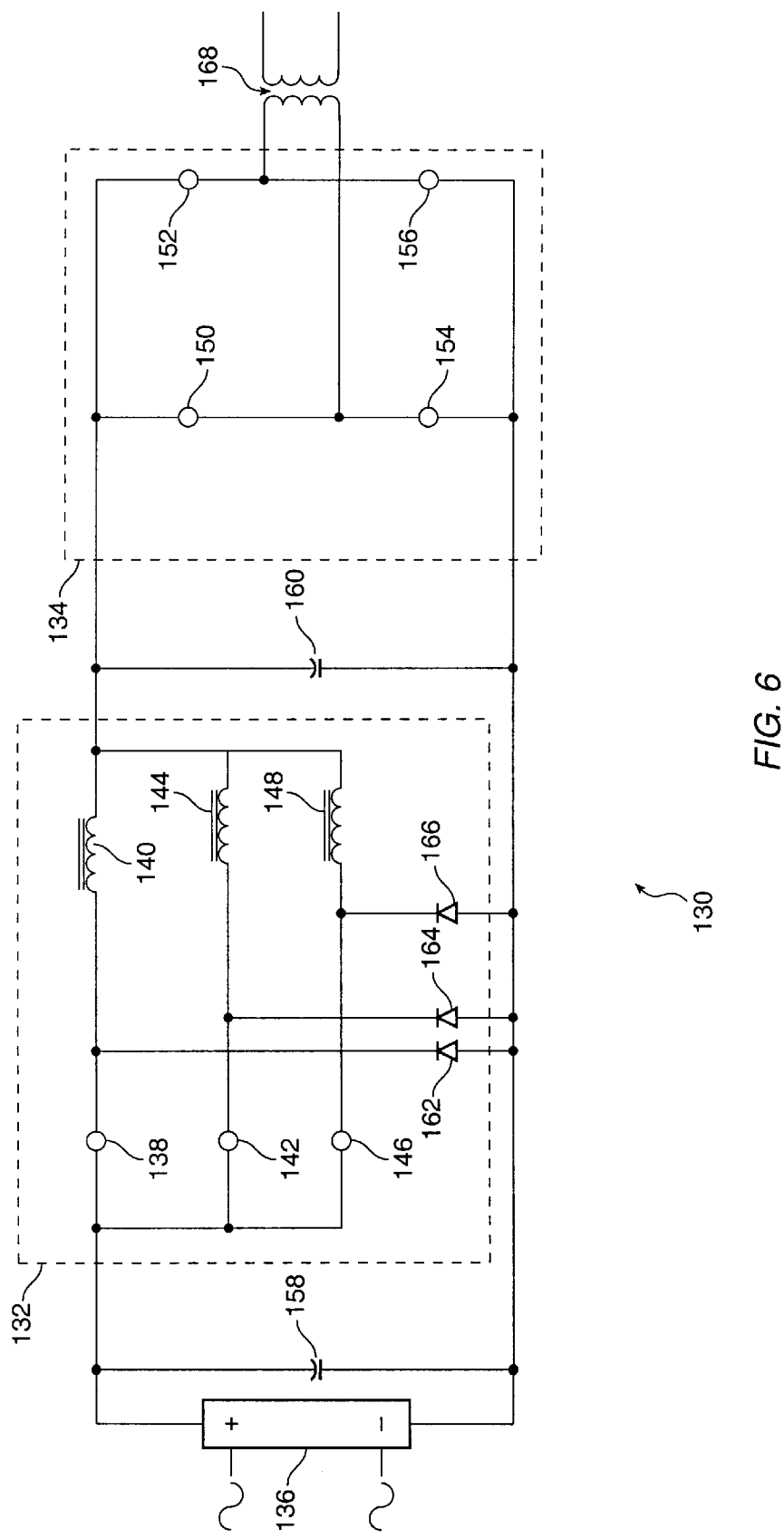
FIG. 6 is a schematic diagram of a two-stage power converter in accordance with a specific embodiment of the present invention.

FIG. 6 is a schematic diagram of a two-stage power converter in accordance with a specific embodiment of the present invention. The converter of FIG. 6 has three interleaved buck regulators in its buck regulator stage. The converter is organized similarly to the converter shown in FIGS. 3 and 5, except that this converter comprises three interleaved buck regulators.

The converter 130 includes a buck regulator stage 132 and a bridge stage 134. By way of example, the converter produces a 60 KHz AC current. The converter operates as follows. A three-phase power source (e.g., 208 volts at 60 hertz) is applied to rectifier 136. Unregulated rectified DC power is applied to the buck regulator stage 132, which includes three interleaved buck regulators. One buck regulator comprises switch 138 and inductor 148. A second buck regulator comprises switch 142 and inductor 144. The third buck regulator comprises switch 146 and inductor 148. The switches comprise transistors. The buck regulator stage 132 produces regulated DC current that is received by the bridge 134. Each of the buck regulators in buck regulator stage 132 operates at 40 KHz. The bridge comprises a number of switches 150, 152, 154, 156 that act in concert to produce an alternating current from the DC pulses.

Capacitors 158, 160 and diodes 162, 164, 166 are also shown. The output of bridge stage 134 is received by transformer 168.

FIG. 7A is a diagram showing the switch current at one switch in a buck regulator stage having three interleaved buck regulators, in accordance with a specific embodiment of the present invention as shown in FIG. 6. It can be seen that the switch is operating at 40 KHz. It will be appreciated that all three of the switches in the buck regulator stage of the power converter shown in FIG. 6 operate at 40 KHz and that the switches are phased to operate at 120 degrees with each other.

FIG. 7B is a diagram showing the inductor currents in the three interleaved buck regulators in the buck regulator stage of a two-stage power converter in accordance with a specific embodiment of the present invention as shown in FIG. 6. One wave form 170 is produced by one of the three interleaved buck regulators. Wave form 170 corresponds to the switch current shown in FIG. 7A. Wave forms 172, 174 are produced by the other buck regulators. Each of the wave forms has a frequency of 40 KHz. The wave forms are 120 degrees out of phase with each other.

FIG. 7C is a diagram showing the combined wave form produced by the buck regulator stage of a two-stage power converter in accordance with a specific embodiment of the present invention as shown in FIG. 6. Wave form 176 represents the combined current of wave forms 170, 172, 174 and has a frequency of 120 KHz.

FIG. 7D is a diagram showing the wave form produced by the bridge stage of a two-stage power converter in accordance with a specific embodiment of the present invention as shown in FIG. 6. Wave form 178 has a frequency of 60 KHz.

FIGS. 7A, 7B, 7C and 7D have equivalent horizontal axes so as to better compare the wave forms. FIG. 7C exemplifies the combined wave form of a buck regulator stage 132 providing DC current with AC component of frequency of 120 KHz. The bridge stage 134 of FIG. 6 requires two DC current pulses from the buck stage to produce a single cycle of the output AC.

Figure 7:
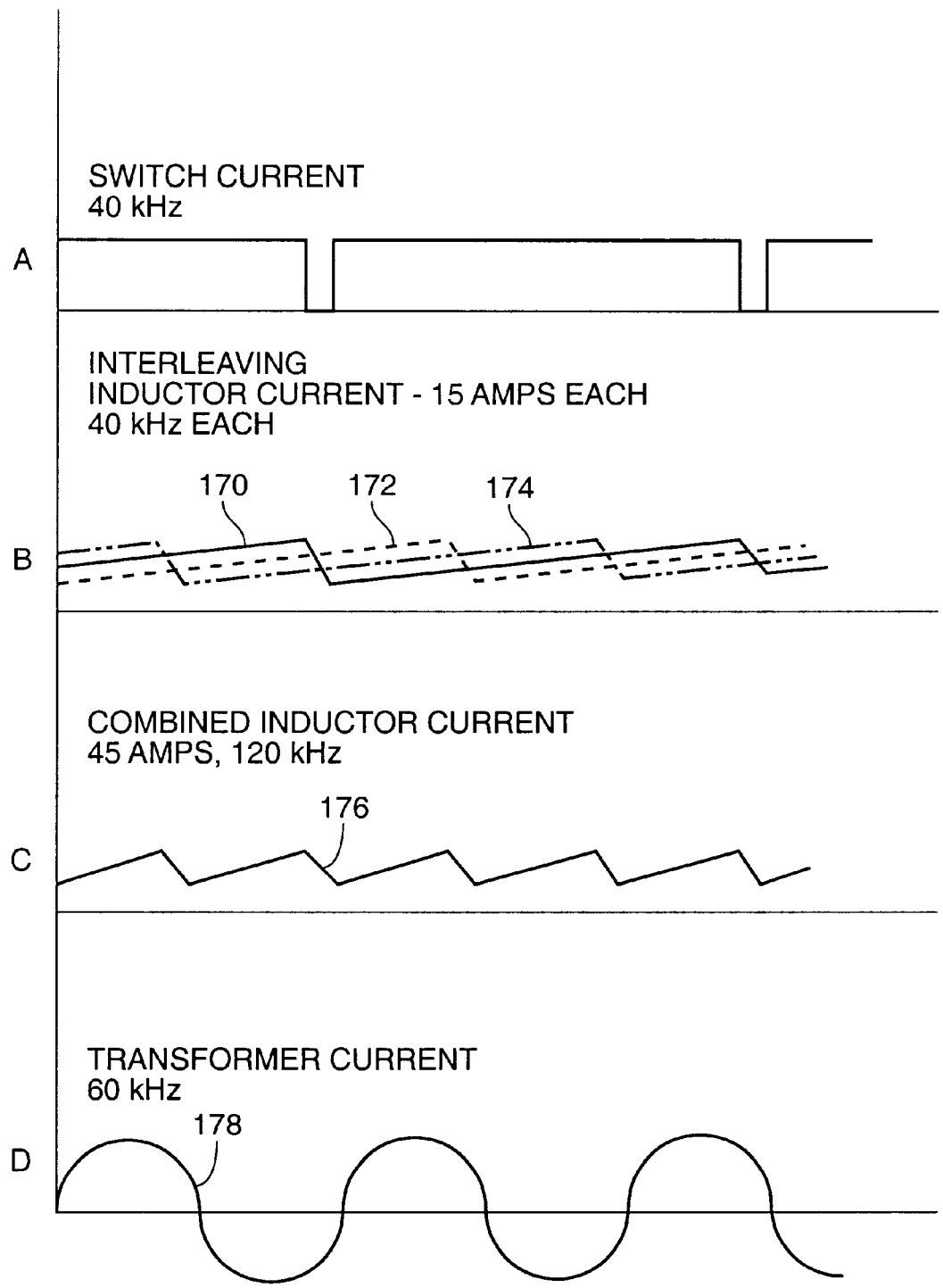
FIG. 7A is a diagram showing the switch current at one switch in a buck regulator stage having three interleaved buck regulators, in accordance with a specific embodiment of the present invention as shown in FIG. 6.
FIG. 7B is a diagram showing the inductor currents in the three interleaved buck regulators in the buck regulator stage of a two-stage power converter in accordance with a specific embodiment of the present invention as shown in FIG. 6.
FIG. 7C is a diagram showing the combined wave form produced by the buck regulator stage of a two-stage power converter in accordance with a specific embodiment of the present invention as shown in FIG. 6.
FIG. 7D is a diagram showing the wave form produced by the bridge stage of a two-stage power converter in accordance with a specific embodiment of the present invention as shown in FIG. 6.

Again, by providing a plurality of interleaved buck regulators in the buck regulator stage, the individual buck regulators in the stage are allowed to operate both at lower frequencies and at lower power. In the example of FIGS. 6 and 7, the buck regulator switches operate at one third the frequency of switches in prior art buck regulators, and each buck regulator carries only one third of the current carried in prior art buck regulators.

In the converter exemplified in FIG. 6, the buck regulator switches may be controlled by pulse width modulation controllers, a clock, current error amplifiers, inductor current sensors, and a voltage error amplifier.

It will be appreciated that the present invention may be practiced using any number of buck regulators in the buck regulator stage. However, embodiments with either two or four buck regulators are preferred.

A mathematical relationship governs the design and organization of the converter of the present invention. Namely, the operation frequency of each of the switches in the buck regulators is equal to two times the frequency of switches in the bridge divided by the number of interleaved buck regulators. Also, it should be noted that all buck regulators share equal portions of the current that goes through the converter.

Table 5 demonstrates some examples of converters according to the present invention.

TABLE 5

| # of buck regulators | operating frequency of bridge switches | operating frequency of buck regulator switches | total converter current | current per each buck regulator |
|---|---|---|---|---|
| 2 | 50 KHz | 50 KHz | 40 Amps | 20 Amps |
| 3 | 60 KHz | 40 KHz | 45 Amps | 15 Amps |
| 4 | 50 KHZ | 25 KHz | 40 Amps | 10 Amps |
| 4 | 60 KHz | 30 KHz | 60 Amps | 15 Amps |
| 6 | 120 KHz | 40 KHz | 60 Amps | 10 Amps |
| 8 | 50 KHz | 12.5 KHz | 40 Amps | 5 Amps |

The present invention is advantageous for high frequency power converters, because power losses are reduced due to the lower required operating frequencies of transistor switches in the buck regulator stage. Further, the invention is advantageous for high power converters, because the lower currents through each buck regulator allow for less expensive switches and inductors to be used. The good input ripple rejection due to current mode control makes this topology very attractive for applications requiring low output noise.

In one aspect, the invention comprises a two-stage power converter. The converter produces HV DC from unregulated DC bus. The converter comprises a buck regulator stage having a plurality of interleaved buck regulators connected in parallel followed by a bridge stage. The bridge receives DC current from the buck and produces alternating currents, which is fed to step-up transformer. Each of the buck regulators includes a switch operating at a frequency equal to two times the bridge operating frequency divided by the number of interleaved buck regulators.

The power converter may further comprise a clock. The clock provides timing signals to each of the buck regulators and the bridge.

In the power converter, each buck regulator comprises a current sensor for sensing current through the inductor. A pulse width modulation controller, a current error amplifier, and the clock together control the switch. The current error amplifier senses the inductor current.

The power converter may further comprise a step-up transformer for receiving the alternating current and producing a higher voltage alternating current, which after rectification and filtering becomes low noise high power high voltage source.

The power converter may also comprise a voltage feedback error amplifier for sensing the higher voltage at the output and providing a control signal to the current error amplifiers in each of the plurality of buck regulators.

In another aspect, the invention includes a method of converting a direct current into an alternating current of a first frequency. The method comprises providing the DC voltage to a plurality of interleaved buck regulators connected in parallel, where each of the buck regulators include a switch; controlling each of the switches to provide a direct current pulse at a second frequency where the second frequency is equal to two times the first frequency divided by the number of interleaved buck regulators; and converting the direct current pulses into an alternating current in the bridge stage.

The method may include controlling the switch in each of the buck regulators by providing a clock; providing a current sensor in each of the buck regulators, for sensing current through the inductor; providing a current error amplifier in each of the buck regulators; and providing a pulse width modulation controller in each of the buck regulators where the current error amplifier, the pulse width modulation controller, and the clock together control the switch.

The method may include transforming the voltage of the alternating current into a higher voltage alternating current.

The method may include providing a voltage feedback error amplifier. The voltage feedback error amplifier senses the output voltage and provides control signals to each of the plurality of buck regulators.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A two stage power converter, said converter producing an alternating current from a direct current, said alternating current having a first frequency, the converter comprising:

a first stage having a plurality of interleaved buck regulators connected in parallel, where each of the buck regulators includes a switch operating at a second frequency, where said second frequency is equal to two times said first frequency divided by the number of the plurality of interleaved buck regulators in the first stage; and a second stage comprising a bridge, said bridge receiving direct current pulses from the first stage and producing the alternating current.

2. The power converter of claim 1, further comprising a clock, said clock providing timing signals to each of the buck regulators and the bridge.

3. The power converter of claim 2, wherein each buck regulator further comprises:

an inductor current sensor, wherein the current through the inductor is controlled by said switch and sensed by said inductor current sensor;

a pulse width modulation controller; and a current error amplifier, said current error amplifier sensing the inductor current, wherein said current error amplifier, said pulse width modulation controller, and said clock together control the switch.

4. The power converter of claim 3, further comprising:

a step-up transformer, said transformer receiving said alternating current and producing a higher voltage alternating current.

5. The power converter of claim 4, further comprising:

a voltage feedback error amplifier, said voltage feedback error amplifier sensing said higher voltage and providing a control signal to the current error amplifiers in each of the plurality of buck regulators.

6. The power converter of claim 1, wherein the first stage comprises two buck regulators.

7. The power converter of claim 1, wherein the first stage comprises four buck regulators.

8. A method of converting a direct current into an alternating current, said alternating current having a first frequency, the method comprising:

providing the direct current to a plurality of interleaved buck regulators connected in parallel, each of said buck regulators including a switch;

controlling each of said switches to provide a direct current pulse at a second frequency where said second frequency is equal to two times said first frequency divided by the number of the plurality of interleaved buck regulators connected in parallel; and converting said direct current pulses into an alternating current.

9. The method of claim 8, wherein said controlling each of the buck regulators further comprises:

providing a clock;

providing an inductor current sensor in each of the buck regulators, wherein the current through the inductor is controlled by said switch and sensed by said current sensor;

providing a current error amplifier in each of the buck regulators; and providing a pulse width modulation controller in each of the buck regulators, wherein said current error amplifier, said pulse width modulation controller, and said current sensor, and said clock together control the switch.

10. The method of claim 9, further comprising:

transforming the voltage of said alternating current into a higher voltage alternating current.

11. The method of claim 10, further comprising:

providing a voltage feedback error amplifier, said voltage feedback error amplifier sensing the output voltage and providing control signals to all of the plurality of buck regulators.

* * * * *